(12) United States Patent
Harrison et al.

(10) Patent No.: US 11,619,983 B2
(45) Date of Patent: Apr. 4, 2023

(54) METHOD AND APPARATUS FOR RESOLVING TOUCH SCREEN AMBIGUITIES (71) Applicant: QEEXO, CO., San Jose, CA (US)

(72) Inventors: Chris Harrison, Pittsburgh, PA (US); Julia Schwarz, Pittsburgh, PA (US); Robert Bo Xiao, Pittsburgh, PA (US)

(73) Assignee: QEEXO, CO., Mountain View, CA (US)

(*) Notice: Subject to any disclaimer, the term of this patent is extended or adjusted under 35 U.S.C. 154(b) by 0 days.

(21) Appl. No.: 14/486,800

(22) Filed: Sep. 15, 2014

(65) Prior Publication Data
US 2016/0077664 A1 Mar. 17, 2016

(51) Int. Cl.
G06F 1/3234 (2019.01)
G06F 3/041 (2006.01)
G06F 3/0488 (2022.01)

(52) U.S. Cl.
CPC .......... G06F 1/3262 (2013.01); G06F 3/0488 (2013.01); G06F 3/04186 (2019.05); G06F 2203/04104 (2013.01)

(58) Field of Classification Search
CPC .... G06F 3/0488; G06F 3/04883; G06F 3/044; G06F 3/04886; G06F 3/045; G06F 3/0412; G06F 3/0416; G06F 3/046; G06F 3/0421; G06F 3/042; G06F 3/03545; G06F 3/0317; G06F 203/04109; G06F 3/037; G06F 3/0436; G06F 3/0433; G06F 3/043; G06F 3/0418; G06F 3/033; G06F 1/3262; G06F 3/04186; G06F 2203/04104; G02B 6/2852; H03K 2217/96011
See application file for complete search history.

(56) References Cited

U.S. PATENT DOCUMENTS

| | | | |
|---|---|---|---|
| 2,008,028 | A | 7/1935 | Mccortney et al. |
| 2,430,005 | A | 11/1947 | Denneen et al. |
| 3,354,531 | A | 11/1967 | Pryor |
| 3,441,790 | A | 4/1969 | McDonald |

(Continued)

FOREIGN PATENT DOCUMENTS

| | | |
|---|---|---|
| CN | 1797305 A | 7/2006 |
| CN | 1928781 A | 3/2007 |

(Continued)

OTHER PUBLICATIONS

Asano, Futoshi, Goto, Masataka, Itou, Katunobu, Asoh, Hideki; Real-Time Sound Source Localization and Separation System and its Application to Automatic Speech Recognition; Proceedings of Eurospeech, 2001; p. 1013-1016; 2001.

(Continued)

Primary Examiner — Patrick N Edouard
Assistant Examiner — Joseph P Fox
(74) Attorney, Agent, or Firm — Kwan & Olynick LLP (57) ABSTRACT A method and apparatus that resolve near touch ambiguities in a touch screen includes detecting a touch screen touch event and detecting a vibro-acoustic event. These events generate signals received respectively by two different sensors and/or processes. When the two events occur within a pre-defined window of time, they may be considered to be part of the same touch event and may signify a true touch.

9 Claims, 4 Drawing Sheets

(56) References Cited

U.S. PATENT DOCUMENTS

| | | |
|---|---|---|
| 4,561,105 A | 12/1985 | Crane et al. |
| 4,597,932 A | 7/1986 | Kurihara et al. |
| 4,686,332 A | 8/1987 | Greanias et al. |
| 5,483,261 A | 1/1996 | Yasutake |
| 5,544,265 A | 8/1996 | Bozinovic et al. |
| 5,596,656 A | 1/1997 | Goldberg |
| 5,615,285 A | 3/1997 | Beernink |
| 5,625,818 A | 4/1997 | Zarmer et al. |
| 5,666,438 A | 9/1997 | Beernink et al. |
| 5,867,163 A | 2/1999 | Kurtenbach |
| 5,933,514 A | 8/1999 | Ostrem et al. |
| 6,028,593 A | 2/2000 | Rosenberg et al. |
| 6,118,435 A * | 9/2000 | Fujita ............... G06F 3/016 345/173 |
| 6,208,330 B1 | 3/2001 | Hasegawa et al. |
| 6,212,295 B1 | 4/2001 | Ostrem et al. |
| 6,222,465 B1 | 4/2001 | Kumar et al. |
| 6,246,395 B1 | 6/2001 | Goyins et al. |
| 6,252,563 B1 | 6/2001 | Tada et al. |
| 6,323,846 B1 | 11/2001 | Westerman et al. |
| 6,337,698 B1 | 1/2002 | Kelly, Jr. et al. |
| 6,492,979 B1 * | 12/2002 | Kent ............... G06F 3/0414 178/18.01 |
| 6,504,530 B1 * | 1/2003 | Wilson ............ G06F 3/0418 345/173 |
| 6,643,663 B1 | 11/2003 | Dabney et al. |
| 6,707,451 B1 | 3/2004 | Nagaoka |
| 6,748,425 B1 | 6/2004 | Duffy et al. |
| 6,772,396 B1 | 8/2004 | Cronin et al. |
| 6,933,930 B2 | 8/2005 | Devige et al. |
| 6,943,665 B2 | 9/2005 | Chornenky |
| 7,050,955 B1 | 5/2006 | Carmel et al. |
| 7,084,884 B1 | 8/2006 | Nelson et al. |
| 7,098,896 B2 | 8/2006 | Kushler et al. |
| 7,212,197 B1 | 5/2007 | Schkolne et al. |
| 7,443,396 B2 | 10/2008 | Ilic |
| 7,581,194 B2 | 8/2009 | Iwema et al. |
| 7,982,724 B2 | 7/2011 | Hill |
| 8,086,971 B2 | 12/2011 | Radivojevic et al. |
| 8,144,126 B2 * | 3/2012 | Wright ............. G06F 1/3203 178/18.03 |
| 8,154,524 B2 | 4/2012 | Wilson et al. |
| 8,154,529 B2 | 4/2012 | Sleeman et al. |
| 8,170,346 B2 | 5/2012 | Ludwig |
| 8,199,126 B1 | 6/2012 | Taubman |
| 8,253,744 B2 | 8/2012 | Macura et al. |
| 8,269,744 B2 | 9/2012 | Agari et al. |
| 8,327,029 B1 | 12/2012 | Purser |
| 8,441,790 B2 | 5/2013 | Pance et al. |
| 8,547,357 B2 | 10/2013 | Aoyagi |
| 8,624,878 B2 | 1/2014 | Sarwar et al. |
| 8,670,632 B2 | 3/2014 | Wilson |
| 8,674,943 B2 | 3/2014 | Westerman et al. |
| 8,743,091 B2 | 6/2014 | Bernstein |
| 8,760,395 B2 | 6/2014 | Kim et al. |
| 8,762,332 B2 | 6/2014 | Keebler et al. |
| 8,769,524 B2 | 7/2014 | Bhullar et al. |
| 9,013,452 B2 | 4/2015 | Harrison et al. |
| 9,019,244 B2 | 4/2015 | Harrison |
| 9,030,498 B2 | 5/2015 | Galor et al. |
| 9,052,772 B2 | 6/2015 | West |
| 9,060,007 B2 | 6/2015 | Keebler et al. |
| 9,182,882 B2 | 11/2015 | Fowler et al. |
| 9,329,688 B2 | 5/2016 | Harrison |
| 9,329,715 B2 | 5/2016 | Schwarz et al. |
| 9,377,863 B2 | 6/2016 | Bychkov et al. |
| 9,557,852 B2 | 1/2017 | Tsai et al. |
| 9,612,689 B2 | 4/2017 | Harrison et al. |
| 9,696,859 B1 * | 7/2017 | Heller ............... G06F 3/044 |
| 9,864,453 B2 | 1/2018 | Munemoto et al. |
| 10,082,935 B2 | 9/2018 | Harrison et al. |
| 10,606,417 B2 | 3/2020 | Schwarz |
| 10,642,404 B2 | 5/2020 | Harrison |
| 2002/0009227 A1 | 1/2002 | Goldberg et al. |
| 2002/0057837 A1 | 5/2002 | Wilkinson et al. |
| 2002/0070927 A1 | 6/2002 | Fujitsuka et al. |
| 2002/0126161 A1 | 9/2002 | Kuzunuki et al. |
| 2003/0048260 A1 | 3/2003 | Matusis |
| 2003/0110085 A1 | 6/2003 | Murren et al. |
| 2003/0132922 A1 | 7/2003 | Phillip |
| 2003/0217873 A1 | 11/2003 | Paradiso et al. |
| 2004/0012573 A1 | 1/2004 | Morrison et al. |
| 2004/0021681 A1 | 2/2004 | Liao |
| 2004/0054711 A1 | 3/2004 | Multer |
| 2004/0141010 A1 | 7/2004 | Fitzmaurice et al. |
| 2004/0160421 A1 | 8/2004 | Sullivan |
| 2004/0199867 A1 | 10/2004 | Brandenborg |
| 2004/0225730 A1 | 11/2004 | Brown et al. |
| 2005/0083313 A1 | 4/2005 | Hardie-Bick et al. |
| 2005/0104867 A1 | 5/2005 | Westerman |
| 2005/0131778 A1 | 6/2005 | Bennett et al. |
| 2005/0146512 A1 | 7/2005 | Hill et al. |
| 2005/0165596 A1 | 7/2005 | Adar |
| 2005/0278467 A1 | 12/2005 | Gupta |
| 2005/0289461 A1 | 12/2005 | Amado et al. |
| 2006/0010400 A1 | 1/2006 | Dehlin et al. |
| 2006/0026535 A1 | 2/2006 | Hotelling et al. |
| 2006/0031746 A1 | 2/2006 | Toepfer et al. |
| 2006/0152499 A1 | 7/2006 | Roberts |
| 2006/0173985 A1 | 8/2006 | Moore |
| 2006/0184617 A1 | 8/2006 | Nicholas et al. |
| 2006/0217126 A1 | 9/2006 | Sohm et al. |
| 2006/0230021 A1 | 10/2006 | Diab et al. |
| 2006/0262104 A1 * | 11/2006 | Sullivan ............ G06F 3/0433 345/177 |
| 2006/0288329 A1 | 12/2006 | Gandhi et al. |
| 2007/0011205 A1 | 1/2007 | Majjasie et al. |
| 2007/0044010 A1 | 2/2007 | Sull et al. |
| 2007/0075965 A1 | 4/2007 | Huppi et al. |
| 2007/0085157 A1 | 4/2007 | Fadell et al. |
| 2007/0100959 A1 | 5/2007 | Eichstaedt et al. |
| 2007/0109279 A1 | 5/2007 | Sigona |
| 2007/0126716 A1 | 6/2007 | Haverly |
| 2007/0168367 A1 | 7/2007 | Dickinson et al. |
| 2007/0176907 A1 | 8/2007 | Ishii |
| 2007/0186157 A1 | 8/2007 | Walker et al. |
| 2007/0192674 A1 | 8/2007 | Bodin et al. |
| 2007/0245020 A1 | 10/2007 | Ott, IV |
| 2007/0257767 A1 * | 11/2007 | Beeson ............ G06K 19/0716 340/5.4 |
| 2007/0291297 A1 | 12/2007 | Harmon et al. |
| 2008/0005666 A1 | 1/2008 | Sefton et al. |
| 2008/0036743 A1 | 2/2008 | Westerman et al. |
| 2008/0042978 A1 | 2/2008 | Perez-Noguera |
| 2008/0082941 A1 | 4/2008 | Goldberg et al. |
| 2008/0103906 A1 | 5/2008 | Singh |
| 2008/0117168 A1 | 5/2008 | Liu et al. |
| 2008/0126388 A1 | 5/2008 | Naaman |
| 2008/0141132 A1 | 6/2008 | Tsai |
| 2008/0155118 A1 | 6/2008 | Glaser et al. |
| 2008/0158147 A1 | 7/2008 | Westerman et al. |
| 2008/0158168 A1 | 7/2008 | Westerman et al. |
| 2008/0158185 A1 | 7/2008 | Westerman |
| 2008/0168403 A1 | 7/2008 | Westerman et al. |
| 2008/0180406 A1 | 7/2008 | Han et al. |
| 2008/0244468 A1 | 10/2008 | Nishihara et al. |
| 2008/0288347 A1 | 11/2008 | Sifry |
| 2008/0319932 A1 | 12/2008 | Yih et al. |
| 2009/0025987 A1 | 1/2009 | Perksi et al. |
| 2009/0073144 A1 | 3/2009 | Chen et al. |
| 2009/0095540 A1 | 4/2009 | Zachut et al. |
| 2009/0150373 A1 | 6/2009 | Davis et al. |
| 2009/0157206 A1 | 6/2009 | Weinberg et al. |
| 2009/0174679 A1 | 7/2009 | Westerman |
| 2009/0178011 A1 | 7/2009 | Ording et al. |
| 2009/0231275 A1 | 9/2009 | Odgers |
| 2009/0232355 A1 | 9/2009 | Minear et al. |
| 2009/0254869 A1 | 10/2009 | Ludwig et al. |
| 2009/0259628 A1 | 10/2009 | Farrell et al. |
| 2009/0262637 A1 | 10/2009 | Badaye et al. |
| 2009/0267893 A1 | 10/2009 | Kato |
| 2009/0315835 A1 | 12/2009 | De Goes et al. |
| 2009/0318192 A1 | 12/2009 | Leblanc et al. |
| 2010/0036967 A1 | 2/2010 | Caine et al. |

(56) References Cited

U.S. PATENT DOCUMENTS

| | | |
|---|---|---|
| 2010/0060602 A1 | 3/2010 | Agari et al. |
| 2010/0085216 A1 | 4/2010 | Ms |
| 2010/0094633 A1 | 4/2010 | Kawamura et al. |
| 2010/0123666 A1 | 5/2010 | Wickholm et al. |
| 2010/0127997 A1 | 5/2010 | Park et al. |
| 2010/0194703 A1 | 8/2010 | Fedor et al. |
| 2010/0214267 A1 | 8/2010 | Radivojevic et al. |
| 2010/0225601 A1 | 9/2010 | Homma et al. |
| 2010/0251112 A1 | 9/2010 | Hinckley et al. |
| 2010/0265185 A1 | 10/2010 | Oksanen |
| 2010/0271322 A1 | 10/2010 | Kondoh et al. |
| 2010/0274622 A1 | 10/2010 | Kennedy et al. |
| 2010/0279738 A1 | 11/2010 | Kim et al. |
| 2010/0289754 A1 | 11/2010 | Sleeman et al. |
| 2010/0302184 A1 | 12/2010 | East et al. |
| 2010/0306649 A1 | 12/2010 | Russ et al. |
| 2010/0309158 A1 | 12/2010 | Iwayama et al. |
| 2010/0309933 A1 | 12/2010 | Stark et al. |
| 2011/0003550 A1 | 1/2011 | Klinghult et al. |
| 2011/0007000 A1 | 1/2011 | Lim |
| 2011/0018825 A1 | 1/2011 | Kondo et al. |
| 2011/0057670 A1 | 3/2011 | Jordan |
| 2011/0057885 A1 | 3/2011 | Lehtovirta |
| 2011/0074544 A1 | 3/2011 | D'Souza |
| 2011/0074701 A1 | 3/2011 | Dickinson et al. |
| 2011/0080349 A1* | 4/2011 | Holbein .............. G06F 1/3203 345/173 |
| 2011/0133934 A1 | 6/2011 | Tan et al. |
| 2011/0134063 A1 | 6/2011 | Norieda |
| 2011/0134083 A1 | 6/2011 | Norieda |
| 2011/0141066 A1 | 6/2011 | Shimotani et al. |
| 2011/0145706 A1 | 6/2011 | Wilson et al. |
| 2011/0164029 A1 | 7/2011 | King et al. |
| 2011/0167391 A1 | 7/2011 | Momeyer et al. |
| 2011/0169763 A1 | 7/2011 | Westerman et al. |
| 2011/0169778 A1 | 7/2011 | Nungester et al. |
| 2011/0173235 A1 | 7/2011 | Aman et al. |
| 2011/0175813 A1 | 7/2011 | Sarwar et al. |
| 2011/0175821 A1 | 7/2011 | King |
| 2011/0175832 A1 | 7/2011 | Miyazawa |
| 2011/0187652 A1* | 8/2011 | Huibers .............. G06F 3/0418 345/173 |
| 2011/0202848 A1 | 8/2011 | Ismalon |
| 2011/0210943 A1 | 9/2011 | Zaliva |
| 2011/0231290 A1 | 9/2011 | Narcisse et al. |
| 2011/0238613 A1 | 9/2011 | Shehory et al. |
| 2011/0246463 A1 | 10/2011 | Carson, Jr. et al. |
| 2011/0246503 A1 | 10/2011 | Bender et al. |
| 2011/0248927 A1 | 10/2011 | Michaelis et al. |
| 2011/0248948 A1 | 10/2011 | Griffin et al. |
| 2011/0261083 A1 | 10/2011 | Wilson |
| 2011/0298798 A1 | 12/2011 | Krah |
| 2011/0310040 A1 | 12/2011 | Ben-Shalom et al. |
| 2012/0001875 A1 | 1/2012 | Li et al. |
| 2012/0007821 A1 | 1/2012 | Zaliva |
| 2012/0007836 A1 | 1/2012 | Wu et al. |
| 2012/0011106 A1 | 1/2012 | Reid et al. |
| 2012/0019562 A1 | 1/2012 | Park et al. |
| 2012/0051596 A1 | 3/2012 | Darnell et al. |
| 2012/0056846 A1 | 3/2012 | Zaliva |
| 2012/0078942 A1 | 3/2012 | Cai et al. |
| 2012/0096041 A1 | 4/2012 | Rao et al. |
| 2012/0113017 A1 | 5/2012 | Benko et al. |
| 2012/0120000 A1 | 5/2012 | Lucic et al. |
| 2012/0131139 A1 | 5/2012 | Siripurapu et al. |
| 2012/0146938 A1 | 6/2012 | Worfolk et al. |
| 2012/0150871 A1 | 6/2012 | Hua et al. |
| 2012/0158629 A1 | 6/2012 | Hinckley et al. |
| 2012/0200517 A1 | 8/2012 | Nikolovski |
| 2012/0206330 A1 | 8/2012 | Cao et al. |
| 2012/0256845 A1 | 10/2012 | Noble |
| 2012/0262407 A1 | 10/2012 | Hinckley et al. |
| 2012/0274583 A1 | 11/2012 | Haggerty |
| 2012/0280827 A1 | 11/2012 | Kashiwagi et al. |
| 2012/0280927 A1 | 11/2012 | Ludwig |
| 2012/0287056 A1 | 11/2012 | Ibdah |
| 2012/0287076 A1 | 11/2012 | Dao et al. |
| 2012/0313969 A1 | 12/2012 | Szymczyk et al. |
| 2012/0324349 A1 | 12/2012 | Pop-Lazarov et al. |
| 2013/0009896 A1 | 1/2013 | Zaliva |
| 2013/0014248 A1 | 1/2013 | McLaughlin et al. |
| 2013/0027404 A1 | 1/2013 | Sarnoff |
| 2013/0030782 A1 | 1/2013 | Yogeswaren |
| 2013/0038554 A1 | 2/2013 | West |
| 2013/0091123 A1 | 4/2013 | Chen et al. |
| 2013/0100071 A1 | 4/2013 | Wright et al. |
| 2013/0176264 A1* | 7/2013 | Alameh .............. G06F 3/038 345/174 |
| 2013/0176270 A1 | 7/2013 | Cattivelli et al. |
| 2013/0179773 A1 | 7/2013 | Lee |
| 2013/0187883 A1 | 7/2013 | Lim |
| 2013/0215070 A1 | 8/2013 | Sasaki |
| 2013/0234982 A1 | 9/2013 | Kang |
| 2013/0246861 A1 | 9/2013 | Colley et al. |
| 2013/0257757 A1 | 10/2013 | Kim |
| 2013/0265269 A1 | 10/2013 | Sharma et al. |
| 2013/0278526 A1 | 10/2013 | Zhu |
| 2013/0285942 A1 | 10/2013 | Ko |
| 2013/0287273 A1 | 10/2013 | Huang |
| 2013/0307814 A1 | 11/2013 | Chang |
| 2013/0307828 A1* | 11/2013 | Miller .............. G06F 3/0414 345/177 |
| 2013/0316813 A1 | 11/2013 | Derome et al. |
| 2013/0328813 A1* | 12/2013 | Kuo .............. G06F 3/04883 345/173 |
| 2013/0335333 A1 | 12/2013 | Kukulski et al. |
| 2014/0007002 A1 | 1/2014 | Chang et al. |
| 2014/0009401 A1 | 1/2014 | Bajaj et al. |
| 2014/0022189 A1 | 1/2014 | Sheng et al. |
| 2014/0032880 A1 | 1/2014 | Ka |
| 2014/0037951 A1 | 2/2014 | Shigetomi et al. |
| 2014/0043295 A1* | 2/2014 | Alameh .............. G06F 3/041 345/175 |
| 2014/0071095 A1 | 3/2014 | Godsill |
| 2014/0082545 A1 | 3/2014 | Zhai et al. |
| 2014/0104191 A1 | 4/2014 | Davidson et al. |
| 2014/0104192 A1 | 4/2014 | Davidson et al. |
| 2014/0104274 A1 | 4/2014 | Hilliges et al. |
| 2014/0109004 A1 | 4/2014 | Sadhvani et al. |
| 2014/0168116 A1 | 6/2014 | Sasselli et al. |
| 2014/0184551 A1 | 7/2014 | Igarashi |
| 2014/0208275 A1 | 7/2014 | Mongia et al. |
| 2014/0210788 A1 | 7/2014 | Harrsion et al. |
| 2014/0210791 A1 | 7/2014 | Hanauer et al. |
| 2014/0240271 A1 | 8/2014 | Land et al. |
| 2014/0240293 A1 | 8/2014 | Mccaughan |
| 2014/0240295 A1 | 8/2014 | Harrison |
| 2014/0253477 A1 | 9/2014 | Shim et al. |
| 2014/0267065 A1 | 9/2014 | Levesque |
| 2014/0267085 A1 | 9/2014 | Li et al. |
| 2014/0289659 A1 | 9/2014 | Harrison et al. |
| 2014/0300559 A1 | 10/2014 | Tanimoto et al. |
| 2014/0327626 A1 | 11/2014 | Harrison et al. |
| 2014/0331313 A1 | 11/2014 | Kim et al. |
| 2014/0368436 A1 | 12/2014 | Abzarian et al. |
| 2015/0002405 A1 | 1/2015 | Kuan et al. |
| 2015/0035759 A1 | 2/2015 | Harrison et al. |
| 2015/0077378 A1 | 3/2015 | Duffield |
| 2015/0089435 A1 | 3/2015 | Kuzmin |
| 2015/0145820 A1 | 5/2015 | Huang et al. |
| 2015/0177907 A1 | 6/2015 | Takano |
| 2015/0187206 A1* | 7/2015 | Saurin .............. G08C 17/02 340/5.61 |
| 2015/0227229 A1* | 8/2015 | Schwartz .............. G06F 3/044 345/174 |
| 2015/0242009 A1 | 8/2015 | Xiao et al. |
| 2015/0253858 A1 | 9/2015 | Koukoumidis et al. |
| 2015/0293592 A1 | 10/2015 | Cheong et al. |
| 2016/0012348 A1 | 1/2016 | Johnson et al. |
| 2016/0018942 A1 | 1/2016 | Kang et al. |
| 2016/0062545 A1 | 3/2016 | Lai |
| 2016/0077615 A1 | 3/2016 | Schwarz et al. |
| 2016/0077650 A1 | 3/2016 | Durojaiye et al. |
| 2016/0077664 A1 | 3/2016 | Harrison et al. |

(56) References Cited

U.S. PATENT DOCUMENTS

| | | |
|---|---|---|
| 2016/0085324 A1 | 3/2016 | Schwarz et al. |
| 2016/0085333 A1 | 3/2016 | Christopher |
| 2016/0085372 A1 | 3/2016 | Munemoto et al. |
| 2016/0098185 A1 | 4/2016 | Xiao et al. |
| 2016/0117015 A1 | 4/2016 | Veneri et al. |
| 2016/0156837 A1 | 6/2016 | Rodzevski et al. |
| 2016/0171192 A1 | 6/2016 | Holz et al. |
| 2016/0224145 A1 | 8/2016 | Harrison et al. |
| 2016/0231865 A1 | 8/2016 | Harrison et al. |
| 2016/0299615 A1 | 10/2016 | Schwarz et al. |
| 2017/0024892 A1 | 1/2017 | Harrison et al. |
| 2017/0060279 A1 | 3/2017 | Harrison |
| 2017/0153705 A1 | 6/2017 | Kim et al. |

FOREIGN PATENT DOCUMENTS

| | | |
|---|---|---|
| CN | 101111817 A | 1/2008 |
| CN | 101299174 A | 11/2008 |
| CN | 101339477 A | 1/2009 |
| CN | 101410781 A | 4/2009 |
| CN | 101424974 A | 5/2009 |
| CN | 101438218 A | 5/2009 |
| CN | 101566894 A | 10/2009 |
| CN | 101763190 A | 6/2010 |
| CN | 101763193 A | 6/2010 |
| CN | 101921610 A | 12/2010 |
| CN | 101968696 A | 2/2011 |
| CN | 102153776 A | 8/2011 |
| CN | 102349035 A | 2/2012 |
| CN | 102362249 A | 2/2012 |
| CN | 102708862 | 10/2012 |
| CN | 102789332 A | 11/2012 |
| CN | 103150019 A | 6/2013 |
| CN | 104020878 A | 9/2014 |
| CN | 104160364 | 11/2014 |
| CN | 105431799 A | 3/2016 |
| CN | 106200861 A | 12/2016 |
| CN | 106200861 B | 12/2016 |
| CN | 107077242 A | 8/2017 |
| CN | 107924279 A | 4/2018 |
| CN | 108803933 A | 11/2018 |
| EP | 0 938 039 A2 | 8/1999 |
| EP | 1 659 481 A2 | 5/2006 |
| EP | 1 762 926 A2 | 3/2007 |
| EP | 2 136 358 A | 12/2009 |
| EP | 2 280 337 A2 | 2/2011 |
| EP | 3028125 A4 | 3/2017 |
| EP | 3195095 A4 | 4/2018 |
| EP | 3198386 A4 | 4/2018 |
| EP | 3341829 A4 | 3/2019 |
| GB | 2 344 894 A | 6/2000 |
| GB | 2 468 742 A | 9/2010 |
| JP | H09-69137 A | 3/1997 |
| JP | 2004-213312 A | 7/2004 |
| JP | 2005-018611 A | 1/2005 |
| JP | 2007-524970 A | 8/2007 |
| JP | 2009-543246 A | 12/2009 |
| JP | 2011-028555 A | 2/2011 |
| JP | 2013-519132 A | 5/2013 |
| JP | 2013-532495 A | 8/2013 |
| KR | 10-2002-0075283 A | 10/2002 |
| KR | 10-2011-0061227 A | 6/2011 |
| KR | 10-2012-0100351 A | 9/2012 |
| WO | 94/004992 A1 | 3/1994 |
| WO | 2006-070044 A1 | 7/2006 |
| WO | 2006070044 A1 | 7/2006 |
| WO | 2008/126347 A1 | 10/2008 |
| WO | 2009/071919 A1 | 6/2009 |
| WO | 2011/096694 A2 | 8/2011 |
| WO | 2012/064034 A1 | 5/2012 |
| WO | 2012/166277 | 12/2012 |
| WO | WO 2013059488 A1 * | 4/2013 ........... G06F 3/0416 |
| WO | 2013/061998 A1 | 5/2013 |
| WO | 2014/037951 A1 | 3/2014 |
| WO | 2014/182435 A1 | 11/2014 |
| WO | 2015017831 A3 | 11/2015 |
| WO | 2016048848 A1 | 3/2016 |
| WO | 2016043957 A3 | 9/2016 |
| WO | 2017034752 A1 | 3/2017 |

OTHER PUBLICATIONS

Benko, Hrvoje, Wilson, Andrew, Balakrishnan, Ravin; Sphere: Multi-Touch Interactions on a Spherical Display; Proceedings of UIST, 2008; pp. 77-86; 2008.

Burges, Christopher; A Tutorial on Support Vector Machines for Pattern Recognition; Data Mining and Knowledge Discovery, 2; pp. 121-167; 1998.

Cao, Xiang, Wilson, Andrew, Balakrishnan, Ravin, Hinckley, Ken, Hudson, Scott; ShapeTouch: Leveraging Contact Shape on Interactive Surfaces; IEEE International Workshop on Horizontal Interactive Human Computer System (TABLETOP); pp. 139-146; 2008.

Deyle, Travis, Palinko, Szabolcs, Poole, Erika Shehan, Starner, Thad; Hambone: A Bio-Acoustic Gesture Interface; Proceedings of ISWC, 2007; pp. 1-8; 2007.

Dietz, Paul, Harsham, Bret, Forlines, Clifton, Leigh, Darren, Yerazunis, William, Shipman, Sam, Schmidt-Nielsen, Bent, Ryall, Kathy; DT Controls: Adding Identity to Physical Interfaces; ACM Symposium on User Interface Software & Technology (UIST); pp. 245-252; 2005.

Dietz, Paul, Leigh, Darren; DiamondTouch: A Multi-User Touch Technology; ACM Symposium on User Interface Software & Technology (UIST); pp. 219-226; 2001.

Gutwin, Carl, Greenberg, Saul, Blum, Roger, Dyck, Jeff, Tee, Kimberly, McEwan, Gregor; Supporting Informal Collaboration in Shared-Workspace Groupware; Journal of Universal Computer Science, 14(9); pp. 1411-1434; 2008.

Hall, Mark, Frank, Eibe, Holmes, Geoffrey, Pfahringer, Bernhard, Reutemann, Peter, Witten, Ian; The WEKA Data Mining Software: An Update; SIGKDD Explorations, 11(1); pp. 10-18; 2009.

Harrison, Chris, Tan, Desney, Morris, Dan; Skinput: Appropriating the Body as an Input Surface; Proceedings of CHI, 2010; pp. 453-462; 2010.

Harrison, Chris, Hudson, Scott; Scratch Input: Creating Large, Inexpensive, Unpowered and Mobile Finger Input Surfaces; Proceedings of UIST, 2008; pp. 205-208; 2008.

Hartmann, Bjorn, Ringel Morris, Meredith, Benko, Hrvoje, Wilson, Andrew; Augmenting Interactive Tables with Mice & Keyboards; Proceedings of UIST, 2009; pp. 149-152; 2009.

Hinckley, Ken, Song, Hyunyoung; Sensor Synaesthesia: Touch in Motion, and Motion in Touch; Proceedings of CHI, 2011; pp. 801-810; 2011.

Hinckley, Ken, Yatani, Koji, Pahud, Michel, Coddington, Nicole, Rodenhouse, Jenny, Wilson, Andy, Benko, Hrvoje, Buxton, Bill; Pen + Touch=New Tools; Proceedings of UIST, 2010; pp. 27-36; 2010.

Hinkley, Ken, Yatani, Koji, Pahud, Michel, Coddington, Nicole, Rodenhouse, Jenny, Wilson, Andy, Benko, Hrvoje, Buxton, Bill; Manual Deskterity: An Exploration of Simultaneous Pen + Touch Direct Input; Proceedings of CHI, 2010; pp. 2793-2802; 2010.

Holz, Christian, Baudisch, Patrick; The Generalized Perceived Input Point Model and How to Double Touch Accuracy by Extracting Fingerprints; Proceedings of CHI, 2010; pp. 581-590; 2010.

Kaltenbrunner, Martin, Bencina, Ross; reacTIVision: A Computer-Vision Framework for Table-Based Tangible Interaction; Proceedings of TEI, 2007; pp. 69-74; 2007.

Matsushita, Nobuyuki, Rekimoto, Jun; HoloWall: Designing a Finger, Hand, Body, and Object Sensitive Wall; Proceedings of UIST, 1997; pp. 209-210; 1997.

Mimio; http://www.mimio.com.

Olwal, Alex, Wilson, Andrew; SurfaceFusion: Unobtrusive Tracking of Everyday Objects in Tangible User Interfaces; Proceedings of GI, 2008; pp. 235-242; 2008.

Paradiso, Joseph, Leo, Che King; Tracking and Characterizing Knocks Atop Large Interactive Displays; Sensor Review, 25(2); pp. 134-143; 2005.

(56) References Cited

OTHER PUBLICATIONS

Paradiso, Joseph, Hsiao, Kai-yuh, Strickon, Joshua, Lifton, Joshua, Adler, Ari; Sensor Systems for Interactive Surfaces; IBM Systems Journal, 39(3-4); pp. 892-914; 2000.
Patten, James, Ishii, Hiroshi, Hines, Jim, Pangaro, Gian; Sensetable: A Wireless Object Tracking Platform for Tangible User Interfaces; Proceedings of CHI, 2001; pp. 253-260; 2001.
Rekimoto, Jun, Saitoh, Masanori; Augmented Surfaces: A Spatially Continuous Work Space for Hybrid Computing Environments; Proceedings of CHI, 1999; pp. 378-385; 1999.
Rekimoto, Jun, Sciammarella, Eduardo; ToolStone: Effective use of the Physical Manipulation Vocabularies of Input Devices; Proceedings of UIST, 2000; pp. 109-117; 2000.
Rekimoto, Jun; SmartSkin: An Infrastructure for Freehand Manipulation on Interactive Surfaces; Proceedings of CHI, 2002; pp. 113-120; 2002.
Vandoren, Peter, Van Laerhoven, Tom, Claesen, Luc, Taelman, Johannes, Di Fiore, Fabian, Van Reeth, Frank, Flerackers, Eddy; DIP-IT: Digital Infrared Painting on an Interactive Table; Proceedings of CHI, 2008; pp. 2901-2906; 2008.
Wang, Feng, Ren, Xiangshi; Empirical Evaluation for Finger Input Properties in Multi-Touch Interaction; Proceedings of CHI, 2009; pp. 1063-1072; 2009.
International Search Report and Written Opinion for PCT/US2012/060865; dated Mar. 29, 2013.
Non-Final Office Action—dated Mar. 13, 2015—U.S. Appl. No. 13/958,427, filed Mar. 23, 2013, titled: "Capture of Vibro-Acoustic Data Used to Determine Touch Types".
Final Office Action—dated Jun. 19, 2015—U.S. Appl. No. 13/958,427, filed Mar. 23, 2013, titled: "Capture of Vibro-Acoustic Data Used to Determine Touch Types".
Non-Final Office Action—dated Apr. 6, 2015—U.S. Appl. No. 13/887,711, filed May 6, 2013, titled: "Using Finger Touch Types to Interact With Electronic Devices".
Final Office Action—dated Aug. 7, 2015—U.S. Appl. No. 14/191,329, filed Feb. 26, 2014, titled: "Using Capacitive Images for Touch Type Classification".
Non-Final Office Action—dated Oct. 1,2015—U.S. Appl. No. 14/492,604, filed Sep. 22, 2014, titled "Method and Apparatus for Improving Accuracy of Touch Screen Event Analysis By Use of Edge Classification".
International Search Report and Written Opinion received for PCT Application No. PCT/US2014/049485 dated Nov. 17, 2014.
International Search Report and Written Opinion received for PCT Application No. PCT/US2014/033380 dated Mar. 13, 2015.
International Search Report and Written Opinion received for PCT Application No. PCT/US2014/034977 dated Sep. 18, 2014.
Non-Final Office Action—dated Oct. 7, 2015—U.S. Appl. No. 14/495,041, filed Sep. 24, 2014, titled "Method for Improving Accuracy of Touch Screen Event Analysis by Use of Spatiotemporal Touch Patterns".
Extended European Search Report dated Mar. 19, 2018 in European Patent Application No. 15843933.1, 8 pages.
Extended European Search Report dated Mar. 27, 2018 in European Patent Application No. 15843989.3, 8 pages.
Extended European Search Report dated May 14, 2018 in European Patent Application No. 15847469.2, 11 pages.
Weidong, S. et al., "SenGuard: Passive user identification on smartphones using multiple sensors," IEEE 7th International Conference on Wireless and Mobile Computing, Networking and Communications (WiMob), pp. 141-148, 2011.
Final Office Action dated Feb. 26, 2016 in U.S. Appl. No. 14/492,604, 16 pages.
Non-Final Office Action dated Sep. 9, 2016 in U.S. Appl. No. 13/887,711, 24 pages.
Non-Final Office Action dated Sep. 29, 2016 in U.S. Appl. No. 14/834,434, 12 pages.
Pedro, L et al., "Augmenting touch interaction through acoustic sensing", Proceedings of the ACM International Conference on Interactive Tabletops and Surfaces, pp. 53-56, Nov. 13-16, 2011.
Sarah, M. K. et aL, "A Personal Touch—Recognizing Users Based on Touch Screen Behavior," PhoneSense'12, Nov. 6, 2012, Toronto, ON, Canada, Nov. 6, 2012, 5 pages.
Schwarz, J. et al., "Probabilistic Palm Rejection Using Spatiotemporal Touch Features and Iterative Classification", Proceedings of the SIGCHI Conference on Human Factors in Computing Systems, pp. 2009-2012, Apr. 26-May 1, 2014.
Search Report dated Apr. 21, 2017 in Chinese Patent Application No. 201580000833.0, 1 page.
"Swype Advanced Tips", [http://www.swype.com/tips/advanced-tips], Jun. 25, 2014, retrieved via the Wayback Machine on Jun. 29, 2018, [https:web.archive.org/web/20140625073212/http://www.swype.com/tips/advanced-tips], 2 pages.
"Swype Basics", [http://www.swype.com/tips/swype-basics], retrieved via the Wayback Machine dated Jun. 14, 2014, retrieved via the Wayback Machine on Jun. 29, 2018, [https:web.archive.org/web/20140614200707/http://www.swype.com/tips/swype-basics, 2 pages.
"Swype Tips", [http://www.swype.com/category/tips], Jul. 2, 2014, retrieved via the Wayback Machine on Jun. 29, 2018, [https:web.archive.org/web/20140702102357/http://www.swype.com/category/tips, 2 pages.
Kherallah, Metal., "On-line handwritten digit recognition based on trajectory and velocity modeling," Pattern Recognition Letters, vol. 29, Issue 5, pp. 580-594, Apr. 1, 2008.
Non-Final Office Action dated Apr. 15, 2015 in U.S. Appl. No. 13/856,414, 17 pages.
Non-Final Office Action dated Apr. 16, 2018 in U.S. Appl. No. 13/958,427, 14 pages.
Non-Final Office Action dated Apr. 19, 2017 in U.S. Appl. No. 14/869,998, 7 pages.
Non-Final Office Action dated Apr. 26, 2018 in U.S. Appl. No. 14/495,041, 15 pages.
Non-Final Office Action dated Dec. 20, 2017 in U.S. Appl. No. 14/834,434, 12 pages.
Non-Final Office Action dated Jul. 8, 2015 in U.S. Appl. No. 14/191,329, 18 pages.
Non-Final Office Action dated Jul. 11, 2017 in U.S. Appl. No. 14/390,831, 79 pages.
Non-Final Office Action dated Jul. 17, 2017 in U.S. Appl. No. 15/073,407, 8 pages.
Non-Final Office Action dated Jul. 19, 2017 in U.S. Appl. No. 14/219,919, 20 pages.
Non-Final Office Action dated Jun. 9, 2016 in U.S. Appl. No. 14/612,089, 11 pages.
Non-Final Office Action dated May 7, 2018 in U.S. Appl. No. 14/191,329, 17 pages.
Non-Final Office Action dated May 9, 2018 in U.S. Appl. No. 13/887,711, 27 pages.
Non-Final Office Action dated Nov. 15, 2017 in U.S. Appl. No. 15/198,062, 24 pages.
Non-Final Office Action dated Nov. 24, 2015 in U.S. Appl. No. 14/191,329, 31 pages.
Non-Final Office Action dated Oct. 8, 2015 in U.S. Appl. No. 13/958,427, 15 pages.
Non-Final Office Action dated Oct. 18, 2017 in U.S. Appl. No. 15/406,770, 12 pages.
Non-Final Office Action dated Oct. 19, 2015 in U.S. Appl. No. 14/668,870, 6 pages.
Non-Final Office Action dated Oct. 23, 2014 in U.S. Appl. No. 14/275,124, 10 pages.
Non-Final Office Action dated Oct. 25, 2013 in U.S. Appl. No. 13/410,956, 8 pages.
Non-Final Office Action dated Oct. 28, 2015 in U.S. Appl. No. 14/390,831, 22 pages.
Non-Final Office Action dated Sep. 8, 2016 in U.S. Appl. No. 14/492,604, 14 pages.
Notice of Allowance dated Jan. 26, 2015 in U.S. Appl. No. 13/849,698, 27 pages.
Notice of Allowance dated Dec. 6, 2016 in U.S. Appl. No. 14/751,589, 27 pages.
Non-Final Office Action dated Jul. 30, 2018 in U.S. Appl. No. 15/406,770, 20 pages.

(56) References Cited

OTHER PUBLICATIONS

Notice of Allowance dated Feb. 2, 2015 in U.S. Appl. No. 13/780,494, 43 pages.
Final Office Action dated Aug. 8, 2018 in U.S. Appl. No. 14/834,434, 19 pages.
Non-Final Office Action dated Sep. 2, 2014 in U.S. Appl. No. 13/863,193, 41 pages.
Final Office Action dated Mar. 4, 2015 in U.S. Appl. No. 13/863,193, 50 pages.
Non-Final Office Action dated Jan. 7, 2016 in U.S. Appl. No. 13/863,193, 58 pages.
Final Office Action dated Sep. 15, 2016 in U.S. Appl. No. 13/863,193, 50 pages.
Non-Final Office Action dated Apr. 6, 2017 in U.S. Appl. No. 13/863,193, 70 pages.
Final Office Action dated Jan. 9, 2018 in U.S. Appl. No. 13/863,193, 50 pages.
Notice of Allowance dated May 22, 2018 in U.S. Appl. No. 13/863,193, 73 pages.
Notice of Allowance dated Sep. 1, 2016 in U.S. Appl. No. 13/856,414, 28 pages.
Chinese Office Action for Chinese Patent Application No. 201510240522.3 dated Jun. 28, 2018, 30 pages (Including English translation).
Chinese Office Action for Chinese Patent Application No. 201280062500.7, dated Apr. 27, 2018, 19 pages (Including English translation).
Chinese Office Action for Chinese Patent Application No. 201280062500.7, dated Oct. 10, 2018, 14 pages.
Office Action dated Mar. 30, 2018 for U.S. Appl. No. 15/886,562, 45 pages.
Office Action dated Aug. 10, 2018 for U.S. Appl. No. 15/886,562, 86 pages.
Japanese Office Action dated Aug. 1, 2018 for Japanese Patent Application No. 2017-049566, 9 pages (including English translation).
Korean Office Action dated Jan. 10, 2019 for Korean Patent Application No. 2014-7010323, 12 pages (Including English translation).
Office Action dated Jan. 28, 2019 for U.S. Appl. No. 15/836,798, 30 pages.
Final Office Action received for U.S. Appl. No. 15/075,648 dated Dec. 21, 2018, 13 pages.
Non-Final Office Action received for U.S. Appl. No. 15/815,679 dated Sep. 28, 2018, 69 pages.
Final Office Action received for U.S. Appl. No. 15/198,062 dated Sep. 6, 2018, 32 pages.
Chinese Office Action dated Apr. 21, 2017 for Chinese Patent Application No. 201480022056.5, 23 pages (with Translation).
Chinese Office Action dated Feb. 9, 2018 for Chinese Patent Application No. 201480022056.5, 19 pages (with Translation).
Non-Final Office Action received for U.S. Appl. No. 16/126,175 dated Nov. 1, 2018, 86 pages.
Third Chinese Office Action received for Chinese Patent Application No. 201480022056.5 dated Jul. 19, 2018, 6 pages.(Including English translation).
Communication pursuant to Article 94(3) EPC for European Patent Application No. 14785422.8 dated Nov. 22, 2018, 5 pages.
Communication pursuant to Article 94(3) EPC for European Patent Application No. 15845310.0 dated Jan. 3, 2019, 4 pages.
Communication pursuant to Article 94(3) EPC for European Patent Application No. 15840819.5 dated Jan. 23, 2019, 6 pages.
Chinese First Office Action received for Chinese Patent Application No. 201510240372.6 dated Sep. 27, 2018, 18 pages (Including English translation).
Chinese Second Office Action received for Chinese Patent Application No. 201510240372.6 dated May 15, 2019, 16 pages (Including English translation).
Communication pursuant to Article 94(3) EPC for European Patent Application No. 15843933.1 dated Jan. 23, 2019, 6 pages.
Chinese Search Report received for Chinese Patent Application No. 201580053216.7, dated Apr. 16, 2019, 2 pages.
European Search Report received for European Patent Application No. 16839786.7, dated Feb. 12, 2019, 10 pages.
Communication pursuant to Rules 70(2) and 70a(2) EPC received for European Patent Application No. 16839786.7 dated Mar. 1, 2019, 1 page.
Chinese Second Office Action received for Chinese Patent Application No. 201580000833.0 dated Jan. 15, 2018, 17 pages.
European Search Report received for European Patent Application No. 16818725.0, dated Dec. 21, 2018, 11 pages.
Communication pursuant to Rules 70(2) and 70a(2) EPC received for European Patent Application No. 16818725.0 dated Jan. 8, 2019, 1 page.
First Office Action received for Canadian Patent Application No. 2869699, dated Nov. 27, 2014, 3 pages.
Second Office Action received for Canadian Patent Application No. 2869699, dated Jun. 14, 2016, 4 pages.
Third Office Action received for Canadian Patent Application No. 2869699, dated Jan. 9, 2017, 3 pages.
First Examination report received for Australian Patent Application No. 2012225130, dated Feb. 9, 2015, 4 pages.
First Office Action received for Canadian Patent Application No. 2802746, dated Apr. 9, 2013, 3 pages.
Communication pursuant to Article 94(3) EPC received for European Patent Application No. 14832247.2 dated May 3, 2019, 7 pages.
Final Office Action received for U.S. Appl. No. 15/075,648 dated May 31, 2019, 17 pages.
European Search Report dated Apr. 8, 2019 for European Application No. 18195588.1, 7 pages.
Non-Final Office Action received for U.S. Appl. No. 15/836,798 dated Jul. 5, 2019, 95 pages.
Final Office Action received for U.S. Appl. No. 14/684,407 dated Jun. 10, 2019, 26 pages.
Non-Final Office Action received for U.S. Appl. No. 14/191,329 dated Jul. 16, 2019, 30 pages.
First Office Action received for Chinese Patent Application Serial No. 201580051873.8 dated Jun. 21, 2019, 15 pages (Including English Translation).
Final Office Action received for U.S. Appl. No. 13/887,711 dated Jul. 25, 2019, 24 pages.
Final Office Action received for U.S. Appl. No. 14/684,407 dated Sep. 20, 2019, 26 pages.
Final Office Action received for U.S. Appl. No. 14/495,041 dated Aug. 9, 2019, 26 pages.
Non-Final Office Action received for U.S. Appl. No. 14/834,434 dated Aug. 5, 2019, 19 pages.
Final Office Action received for U.S. Appl. No. 16/126,175 dated Aug. 2, 2019, 161 pages.
Non-Final Office Action received for U.S. Appl. No. 14/242,127 dated Jun. 2, 2015, 33 pages.
Final Office Action received for U.S. Appl. No. 14/242,127 dated Sep. 18, 2015, 28 pages.
Non-Final Office Action received for U.S. Appl. No. 14/242,127 dated Dec. 28, 2015, 38 pages.
Final Office Action received for U.S. Appl. No. 14/242,127 dated Mar. 31, 2016, 34 pages.
Notice of Allowance received for U.S. Appl. No. 14/242,127 dated Apr. 13, 2016, 18 pages.
Notice of Allowance received for U.S. Appl. No. 14/242,127 dated Sep. 2, 2016, 16 pages.
Non-Final Office Action received for U.S. Appl. No. 15/206,554 dated Sep. 21, 2016, 36 pages.
Final Office Action issued for U.S. Appl. No. 15/206,554 dated Feb. 1, 2017, 20 pages.
Chinese Office Action for Chinese Patent Application No. 201280062500.7 dated Nov. 7, 2016, 9 pages.
Chinese Office Action for Chinese Patent Application No. 201280062500.7 dated Apr. 17, 2017, 15 pages (Including English translation).

(56) References Cited

OTHER PUBLICATIONS

Japanese Office Action for Japanese Patent Application No. 2014-537253 dated May 16, 2017, 5 pages (Including English translation).
Seo et al.., "Audio Fingerprinting Based on Normalized Spectral Subband Centroids," Proc. ICASSP, {U.S.A.), 2005, vol. 3, p. 213-216. Retrieved on May 29, 2017, 4 pages.
Kunio, "Audio fingerprinting: Techniques and applications", Acoustical Science and Technology, The Acoustical Society of Japan, Feb. 1, 2010, vol. 66, No. 2, p. 71-76. Retrieved on May 29, 2017, 6 pages.
European Search Report received for European Patent Application Serial No. 12842495.9, dated Jul. 24, 2015, 7 pages.
Chinese Search Report dated Mar. 29, 2016 for Chinese Application No. 201280062500.7, 1 page.
Chinese Office Action dated Apr. 15, 2016 for Chinese Application No. 201280062500.7, 11 pages.
Japanese Office Action for Japanese Patent Application No. 2014-537253 dated Nov. 15, 2016, 3 pages.
Japanese Office Action for Japanese Patent Application No. 2014-537253 dated Apr. 26, 2016, 3 pages.
Communication pursuant to Article 94(3) EPC for EP Application No. 12842495.9 dated Jun. 18, 2018, 4 pages.
Japanese Office Action for Japanese Patent Application No. 2017-049566 dated Jun. 5, 2018, 7 pages (Including English translation).
Non-Final Office Action received for U.S. Appl. No. 14/684,407 dated Jul. 8, 2016, 19 pages.
Final Office Action received for U.S. Appl. No. 14/684,407 dated Jan. 18, 2017, 20 pages.
Non-Final Office Action received for U.S. Appl. No. 14/684,407 dated Aug. 2, 2017, 36 pages.
Final Office Action received for U.S. Appl. No. 14/684,407 dated Mar. 12, 2018, 23 pages.
Non-Final Office Action received for U.S. Appl. No. 14/612,089 dated on May 31, 2017, 21 pages.
Final Office Action received for U.S. Appl. No. 15/073,407, dated Dec. 20, 2016, 49 pages.
Non-Final Office Action received for U.S. Appl. No. 13/958,427, dated Nov. 10, 2016, 22 pages.
Final Office Action received for U.S. Appl. No. 14/219,919, dated Aug. 26, 2016, 24 pages.
Non-Final Office Action received for U.S. Appl. No. 14/191,329, dated on Feb. 2, 2017, 29 pages.
Final Office Action received for U.S. Appl. No. 13/887,711, dated Jun. 8, 2017, 33 pages.
Non-Final Office Action received for U.S. Appl. No. 15/075,648, dated Apr. 21, 2017, 8 pages.
Final Office Action received for U.S. Appl. No. 14/492,604, dated Mar. 17, 2017, 37 pages.
Non-Final Office Action received for U.S. Appl. No. 14/495,041, dated Nov. 25, 2016, 35 pages.
Non-Final Office Action received for U.S. Appl. No. 14/503,894, dated May 16, 2017, 33 pages.
Non-Final Office Action received for U.S. Appl. No. 14/684,407, dated Sep. 14, 2018, 24 pages.
Final Office Action received for U.S. Appl. No. 14/834,434, dated May 1, 2017, 18 pages.
Non-Final Office Action received for U.S. Appl. No. 14/751,589, dated Jun. 13, 2016, 20 pages.
International Search Report and Written Opinion for PCT/US2016/044552; dated Oct. 17, 2016, 14 pages.
International Search Report and Written Opinion for PCT/US2016/040194; dated Sep. 19, 2016, 7 pages.
International Search Report and Written Opinion for PCT/US2015/051582; dated Feb. 26, 2016, 12 pages.
International Search Report and Written Opinion for PCT/US2015/051106; dated Jan. 28, 2016, 9 pages.
International Search Report and Written Opinion for PCT/US2015/047616; dated Jul. 1, 2016, 7 pages.
European Patent Office Extended Search Report for EP 14 83 2247; dated Feb. 23, 2017, 11 pages.
European Patent Office Extended Search Report for EP 14 79 4212; dated Nov. 9, 2016, 8 pages.
Non-Final Office Action received for U.S. Appl. No. 14/483,150 dated Dec. 18, 2015, 33 pages.
Non-Final Office Action received for U.S. Appl. No. 14/503,894, dated Dec. 30, 2015, 42 pages.
Non-Final Office Action—dated Jan. 29, 2016 U.S. Appl. No. 14/219,919, 17 pages.
Non-Final Office Action dated Nov. 5, 2015 U.S. Appl. No. 13/887,711, 19 pages.
Final Office Action dated Feb. 24, 2016 U.S. Appl. No. 13/887,711, 23 pages.
International Search Report and Written Opinion for PCT/US2015/051355; dated Dec. 15, 2015, 9 pages.
International Search Report and Written Opinion for PCT/US2015/047428; dated Nov. 27, 2015, 6 pages.
International Search Report and Written Opinion for PCT/US2015/050570; dated Dec. 17, 2015, 8 pages.
International Search Report and Written Opinion for PCT/US2015/014581; dated May 14, 2015, 7 pages.
Non-Final Office Action dated Jun. 13, 2016 in U.S. Appl. No. 15/073,407, 49 pages.
Final Office Action dated Nov. 28, 2014 in U.S. Appl. No. 13/849,698, 21 pages.
Non-Final Office Action dated Jun. 24, 2014 in U.S. Appl. No. 13/849,698, 21 pages.
Non-Final Office Action dated Oct. 16, 2014 in U.S. Appl. No. 13/780,494, 10 pages.
U.S. Appl. No. 13/958,427, filed Aug. 2, 2013, titled: "Capture of Vibro-Acoustic Data Used to Determine Touch Types." 45 pages.
U.S. Appl. No. 14/191,329, filed Feb. 26, 2014, titled: "Using Capacitive Images for Touch Type Classification." 42 pages.
U.S. Appl. No. 13/887,711, filed May 6, 2013, titled: "Using Finger Touch Types to Interact with Electronic Devices" 42 pages.
U.S. Appl. No. 14/492,604, filed Sep. 22, 2014, titled: "Method and Apparatus for Mproving Accuracy of Touch Screen Event Analysis by Use of Edge Classification." 35 pages.
U.S. Appl. No. 14/495,041, filed Sep. 24, 2014, titled: "Method for Improving Accuracy of Touch Screen Event Analysis by Use of Spatiotemporal Touch Patterns." 34 pages.
U.S. Appl. No. 14/483,150, filed Sep. 11, 2014, titled: "Method and Apparatus for Differentiating Touch Screen Users Based on Touch Event Analysis." 38 pages.
U.S. Appl. No. 14/242,127, filed Apr. 1, 2014, titled: "Method and Apparatus for Classifying D Touch Events on a Touch Sensitive Surface ", 36 pages.
U.S. Appl. No. 13/849,698, filed Mar. 23, 2013, titled: "Method and System for Activating Different Interactive Functions Using Different Types of Finger Contacts." 52 pages.
Final Office Action dated Jul. 12, 2017 in U.S. Appl. No. 14/495,041, 14 pages.
Final Office Action dated Jul. 18, 2017 in U.S. Appl. No. 14/191,329, 17 pages.
Final Office Action dated Jun. 8, 2016 in U.S. Appl. No. 14/495,041, 16 pages.
Final Office Action dated Jun. 30, 2017 in U.S. Appl. No. 13/958,427, 15 pages.
Final Office Action dated Mar. 7, 2018 in U.S. Appl. No. 14/219,919, 21 pages.
Final Office Action dated Mar. 28, 2016 in U.S. Appl. No. 13/958,427, 16 pages.
Final Office Action dated May 6, 2016 in U.S. Appl. No. 14/191,329, 17 pages.
Final Office Action dated May 13, 2016 in U.S. Appl. No. 14/390,831, 6 pages.
Final Office Action dated May 20, 2016 in U.S. Appl. No. 14/503,894, 17 pages.
Final Office Action dated Nov. 9, 2016 in U.S. Appl. No. 14/612,089, 11 pages.
Final Office Action dated Nov. 23, 2015 in U.S. Appl. No. 14/668,870, 14 pages.

(56) References Cited

OTHER PUBLICATIONS

International Search Report and Written Opinion dated Jul. 8, 2013 in International Application No. PCT/CA2013/000292, 9 pages.
International Search Report and Written Opinion dated Jun. 6, 2012 in International Patent Application No. PCT/CA2012/050127, 10 pages.
"Making it Easier to Share With Who You Want," Facebook, Aug. 23, 2011, last updated on Dec. 12, 2012 retrieved from https://www.facebook.com/notes/facebook/making-it-easier -to-share-with-who-you-want/10150251867797131/, retrieved on Jun. 1, 2018, 14 pages.
Cheng, B. et aL., "SilentSense: Silent User Identification via Dynamics of Touch and Movement Behavioral Biometrics," Cryptography and Security (cs CR); Human-Computer Interaction, pp. 9, Aug. 31, 2013, 9 pages.
S. Furui, "Digital Speech Processing, synthesis, and recognition" Marcel Dekker, Inc. 2001. 40 pages.
English Translation of Chinese Office Action dated Nov. 3, 2017 in Chinese Application No. 201480002856.0, 12 pages.
English Translation of Final Rejection dated Apr. 27, 2015 in Korean Patent Application No. 10-2014-0027979, 3 pages.
English Translation of Final Rejection dated Dec. 12, 2014 in Korean Patent Application No. 10-2014-0027979, 3 pages.
English Translation of First Office Action dated Feb. 27, 2017 in Chinese Application No. 201480002879.1, 13 pages.
English Translation of First Office Action dated May 2, 2017 in Chinese Patent Application No. 201580000833.0, 9 pages.
English Translation of First Office Action dated Oct. 11, 2017 in Chinese Patent Application No. 20150209998.0, 10 pages.
English Translation of Notification of Reason for Refusal dated Jul. 10, 2014 in Korean patent application No. 10-2014-0027979, 3 pages.
Final Office Action dated Jan. 5, 2018 in U.S. Appl. No. 14/503,894, 16 pages.
English Translation of Second Office Action dated Jul. 6, 2017 in Chinese Application No. 201480002879.1, 14 pages.
English Translation of Third Office Action dated Oct. 16, 2017 in Chinese Application No. 201480002879.1, 4 pages.
Communication pursuant to Article 94(3) EPC dated Feb. 26, 2018 in European Patent Application No. 14785422.8, 7 pages.
Communication pursuant to Article 94(3) EPC dated Mar. 5, 2018 in European Patent Application No. 14794212.2, 5 pages.
Extended European Search Report dated Apr. 16, 2018 in European Application No. 15845310.0, 7 pages.
Extended European Search Report dated Aug. 11, 2016 in European Patent Application No. 14785422.8, 8 pages.
Extended European Search Report dated Aug. 25, 2017 in European Patent Application No. 157 48667.1, 10 pages.
Extended European Search Report dated Jul. 22, 2014 in European Patent Application No. 12755563.9, 5 pages.
Extended European Search Report dated Mar. 16, 2018 in European Patent Application No. 15842839.1, 7 pages.
Extended European Search Report dated Mar. 19, 2018 in European Patent Application No. 15840819.5, 9 pages.
European Office Action for European Patent Application Serial No. 15 842 839.1-1221 dated Apr. 9, 2019, 7 pages.
U.S. Appl. No. 13/958,427, CTFR—Final Rejection, dated Oct. 3, 2019, 2 pgs.
U.S. Appl. No. 13/958,427, Non-Final Rejection, dated Apr. 6, 2020, 13 pgs.
U.S. Appl. No. 14/486,800, Non-Final Rejection, dated Feb. 21, 2020, 26 pgs.
U.S. Appl. No. 14/495,041, USPTO e-Office Action: Notice of Allowance and Fees Due (Ptol-85), dated Nov. 22, 2019, 9 pgs.
Chinese Office Action (including English translation) for App. No. CN201810617137.X, dated Oct. 28, 2020, 12 pages.
Final Office Action dated Feb. 9, 2016 in U.S. Appl. No. 14/486,800, 14 pages.
Final Office Action dated Sep. 6, 2017 in U.S. Appl. No. 14/486,800, 17 pages.
Hinckley et al., "Manual Deskterity: An Exploration of Simultaneous Pen+ Touch Direct Input", Proceedings of CHI, 2010, pp. 2793-2802.
Non-Final Office Action dated Jun. 26, 2018 in U.S. Appl. No. 14/486,800, 25 pages.
Non-Final Office Action received for U.S. Appl. No. 14/486,800, dated Dec. 1, 2016, 29 pages.
Non-Final Office Action—dated Oct. 2, 2015 U.S. Appl. No. 14/486,800, filed Sep. 15, 2014, 21 pages.
Notice of Allowance dated Mar. 9, 2021 for U.S. Appl. No. 16/798,139 (pp. 1-8).
U.S. Appl. No. 13/780,494, filed Feb. 28, 2013, titled: "Input Tools Having Viobro-Acoustically Distinct Regions and Computing Device for Use With the Same." 34 pages.
U.S. Appl. No. 14/483,150, filed Sep. 11, 2014, titled: "Method and Apparatus for Differentiating Touch Screen Users Based on Touch Event Analysis."
U.S. Appl. No. 14/492,604, filed Sep. 22, 2014, titled: "Method and Apparatus for Improving Accuracy of Touch Screen Event Analysis by Use of Edge Classification."
U.S. Appl. No. 14/495,041, filed Sep. 24, 2014, titled: "Method for Improving Accuracy of Touch Screen Event Analysis by Use of Spatiotemporal Touch Patterns."
Office Action (Final Rejection) dated May 9, 2022 for U.S. Appl. No. 13/958,427 (pp. 1-23).
Office Action dated Aug. 3, 2021 for U.S. Appl. No. 13/958,427 (pp. 1-23).

* cited by examiner

METHOD AND APPARATUS FOR RESOLVING TOUCH SCREEN AMBIGUITIES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates generally to the field of touch screen technology and more particularly to a method and apparatus for reducing or eliminating false activation due to near touch events.

BACKGROUND

Touch screen technology has become a relatively common feature in modern electronic devices that use a display coupled with user input capability. This feature is particularly a characteristic of the recent generations of smart phones. Typically, touch screen display screens respond to finger contact to activate the display for further processes. However, because such displays require a relatively significant amount of energy, touch screens are typically designed to be activated by a user only when they are needed and to remain in a dormant or hibernating condition between uses. Such selective activation saves energy and thus preserves battery charge to increase the time between recharging. One problem with using touch screens is inadvertent activation which would consume battery charges unintentionally.

Thus it would be advantageous to reduce or eliminate inadvertent touch screen activations to reduce unnecessary battery usage and prevent unintended function initiation.

SUMMARY

For some embodiments, methods of resolving near touch ambiguities in a touch-sensitive display may include providing a first sensor for detecting a first event indicating an apparent activation of said touch-sensitive display, providing a second sensor for detecting a second event indicating an apparent activation of said touch-sensitive display, wherein said first and second events being distinctly different physical phenomena; and activating said touch-sensitive display only when both said first and second sensors detect respective first and second events within a selected time window.

Other aspects and advantages of the present invention can be seen on review of the drawings, the detailed description and the claims, which follow.

BRIEF DESCRIPTION OF THE DRAWINGS

The included drawings are for illustrative purposes and serve only to provide examples of possible structures and process steps for the disclosed techniques. These drawings in no way limit any changes in form and detail that may be made to embodiments by one skilled in the art without departing from the spirit and scope of the disclosure.

DETAILED DESCRIPTION

Applications of methods and apparatus according to one or more embodiments are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

One or more embodiments may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

The disclosed embodiments may include methods of resolving near touch ambiguities in a touch-sensitive display including providing a first sensor for detecting a first event indicating an apparent activation of said touch-sensitive display, providing a second sensor for detecting a second event indicating an apparent activation of said touch-sensitive display, wherein said first and second events being distinctly different physical phenomena; and activating said touch-sensitive display only when both said first and second sensors detect respective first and second events within a selected time window.

The disclosed embodiments may include apparatus to resolve near touch ambiguities in a touch-sensitive display and include a first sensor for detecting a first event indicating an apparent activation of said touch-sensitive display; a second sensor for detecting a second event indicating an apparent activation of said touch-sensitive display, wherein said first and second events being distinctly different physical phenomena; and at least one logic device responsive to said first and second sensors for activating said touch-sensitive display only when both said first and second sensors detect respective first and second events within a selected time window.

The disclosed embodiments may include a machine-readable medium carrying one or more sequences of instructions for providing social information, which instructions, when executed by one or more processors, cause the one or more processors to detect a first event indicating an apparent activation of said touch-sensitive display; detect a second event indicating an apparent activation of said touch-sensitive display, wherein said first and second events being distinctly different physical phenomena; and activate said touch-sensitive display only when both said first and second sensors detect respective first and second events within a selected time window.

In general, many touch screen technologies (e.g., capacitive touch screens) suffer from false triggers when a finger is close to the screen, but not physically touching, due to for example, capacitive coupling through the air. These false positive events are problematic as users often hover and move their fingers above the display while using touch screen devices, leading to incorrect input.

Such unintended touch screen activations can be detrimental to overall device performance. Frequent unintended activations may incur increased battery usage which requires more frequent recharging and thus reduced availability of the device. Moreover, such unintended touch screen activations can enable device functions of which the user is unaware such as, for example in the case of smart phones, initiating unintentional phone calls which may incur phone charges and waste time for the unintended recipients of such phone calls. Other accidental device functions may alter program settings and thus generate errors that wreak havoc and confusion when the user intentionally seeks to use the program.

Figure 1:
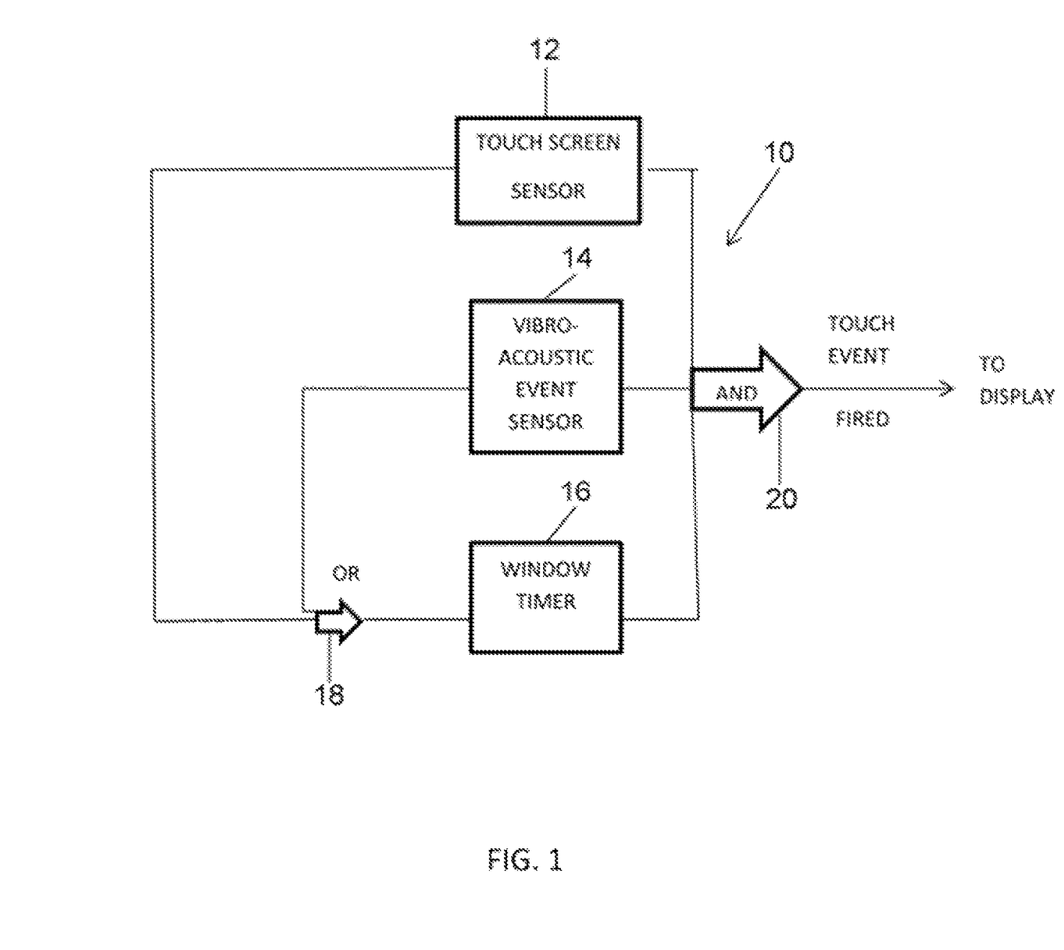
FIG. 1 is an example block diagram illustrating an apparatus for sensing touch events, in accordance with some embodiments of the present invention.

FIG. 1 is an example block diagram illustrating an apparatus for sensing touch events, in accordance with some embodiments of the present invention. Embodiments of the present invention may significantly resolve near touch ambiguities in a touch screen by responding not only to a touch screen touch event, but also to a vibro-acoustic event (i.e., impact sound, acceleration). Only when a finger (or other implement, such as a stylus) physically touches a screen are mechanical vibrations imparted into the device. A near touch produces no such vibrations. These events generate signals received by two different sensors and/or processes and the two events must occur within a pre-defined window of time in order to be considered part of the same touch event. Thus, only a co-occurrence of both of these events may signify a true touch.

Diagram 10 comprises a touch screen sensor 12, a vibro-acoustic event sensor 14 and a window timer 16. The touch screen sensor 12 comprises a touch-sensitive surface on a device (i.e., smart phone) which may be based on well-known capacitive, optical, resistive, electric field, acoustic or other technologies that form the underlying basis for touch interaction. An actual example of such a surface may be by way of illustration one of a Synaptics "Clear Pad Family" of capacitive touch screens.

The vibro-acoustic event sensor 14 may comprise impact sensors, vibration sensors, accelerometers, strain gauges, or acoustic devices such as a condenser microphone, a piezoelectric microphone, MEMS microphone and the like. Actual examples of such devices include by way of illustration: Analog Devices ADXL 362 accelerometers, CUI Inc. 102-1721-ND electret microphones, and Analog Devices MiniSense 100 vibration sensors.

Diagram 10 further comprises logic devices OR gate 18 and AND gate 20. Inputs of the OR gate 18 are connected to both the touch screen sensor 12 and the vibro-acoustic event sensor 14. The output of the OR gate 18 is connected to the window timer 16 to cause the window timer 16 to start a square wave-shaped time window whenever either of the touch screen sensor 12 or the vibro-acoustic event sensor 14 detects a respective event indicating an apparent activation of the display. The touch screen sensor 12, the vibro-acoustic event sensor 14 and the output of the window timer 16 are connected as inputs to the AND gate 20 so that only when both sensors detect respective events within the time window generated by the window timer 16, is a touch event fired resulting in screen activation.

The use of two distinctly different sensors—the touch screen sensor 12 and the vibro-acoustic event sensor 14—produces four possible sensor event combinations, may be described in the Table 1 below.

TABLE 1

| | Touch screen triggered | Touch screen not triggered |
|---|---|---|
| Vibro-acoustic event detected | Touch event fired: YES | Touch event fired: NO |
| No vibro-acoustic event detected | Touch event fired: NO | Touch event fired: NO |

The touch event firing (screen activation) may only occur when both the touch screen sensor 12 and the vibro-acoustic event sensor 14 detect different respective events caused by a physical action of the user. When neither event has been detected by the respective touch screen sensor 12 and the vibro-acoustic event sensor 14, or when only one event has been detected by the touch screen sensor 12 or the vibro-acoustic event sensor 14 in a selected time period, touch event firing does not result.

It may be possible for vibro-acoustic events to occur independent of any user input. For example, by placing a smartphone onto a table, a mechanical vibration is produced that is similar in nature to the impact of a finger hitting a screen. However, without a paired touch screen event, no touch event is triggered.

Further, there are techniques that can use acoustic processing to classify the type of touch (e.g., FingerSense). Thus, some embodiments of the present invention may employ such algorithms such that only a finger touch acoustic event and a touch screen event, trigger a system touch event. Any other impact types/sounds will lead to the touch being rejected, further increasing robustness. Processing may also be employed to reject sensor outputs which fail to meet selected criteria such as peak thresholds or signal shape requirements.

Figure 2:
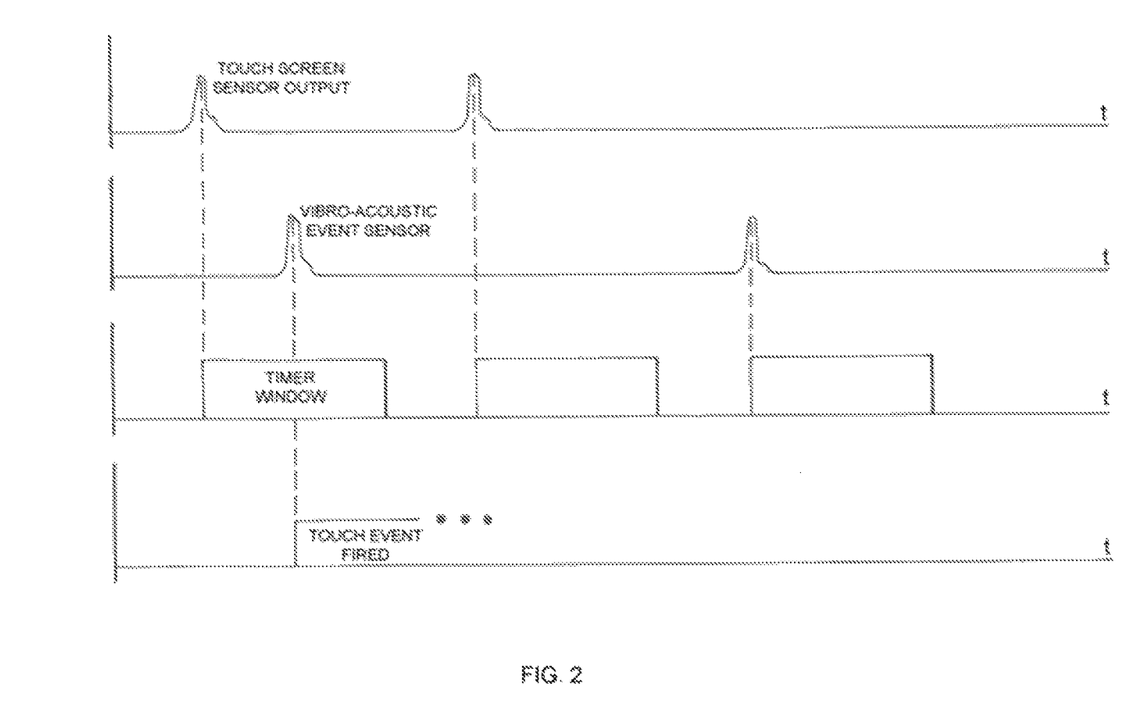
FIG. 2 is an example timing diagram illustrating the relative time relationships of the two sensed events and a timer window, in accordance with some embodiments of the present invention.

FIG. 2 is an example timing diagram illustrating the relative time relationships of the two sensed events and a timer window, in accordance with some embodiments of the present invention. The timing diagram of FIG. 2 illustrates the relationship between the touch screen sensor 12 and the vibro-acoustic event sensor 14, the window timer 16 and the logic devices OR gate 18 and AND gate 20. As seen therein, whenever either of the touch screen sensor 12 or the vibro-acoustic event sensor 14 produces an initial output, the window timer 16 generates an output of selected time period. This time period may be selected to accommodate any anticipated timing sequence between sensor events depending upon the application. For some embodiments, for typical touch screen operation, a time period of less than 500 milliseconds may be utilized. For some embodiments, a maximum time period of 300 milliseconds may be utilized.

As shown further in FIG. 2, when the two sensor-detected events occur within the selected timer window, the touch event is recognized (fired) to activate the touch-sensitive display (not shown). On the other hand, if only one of the two sensor-detected events occurs, the time window is initiated, but because the other event is not detected within the window time period, the touch-sensitive display is not activated.

Figure 3:
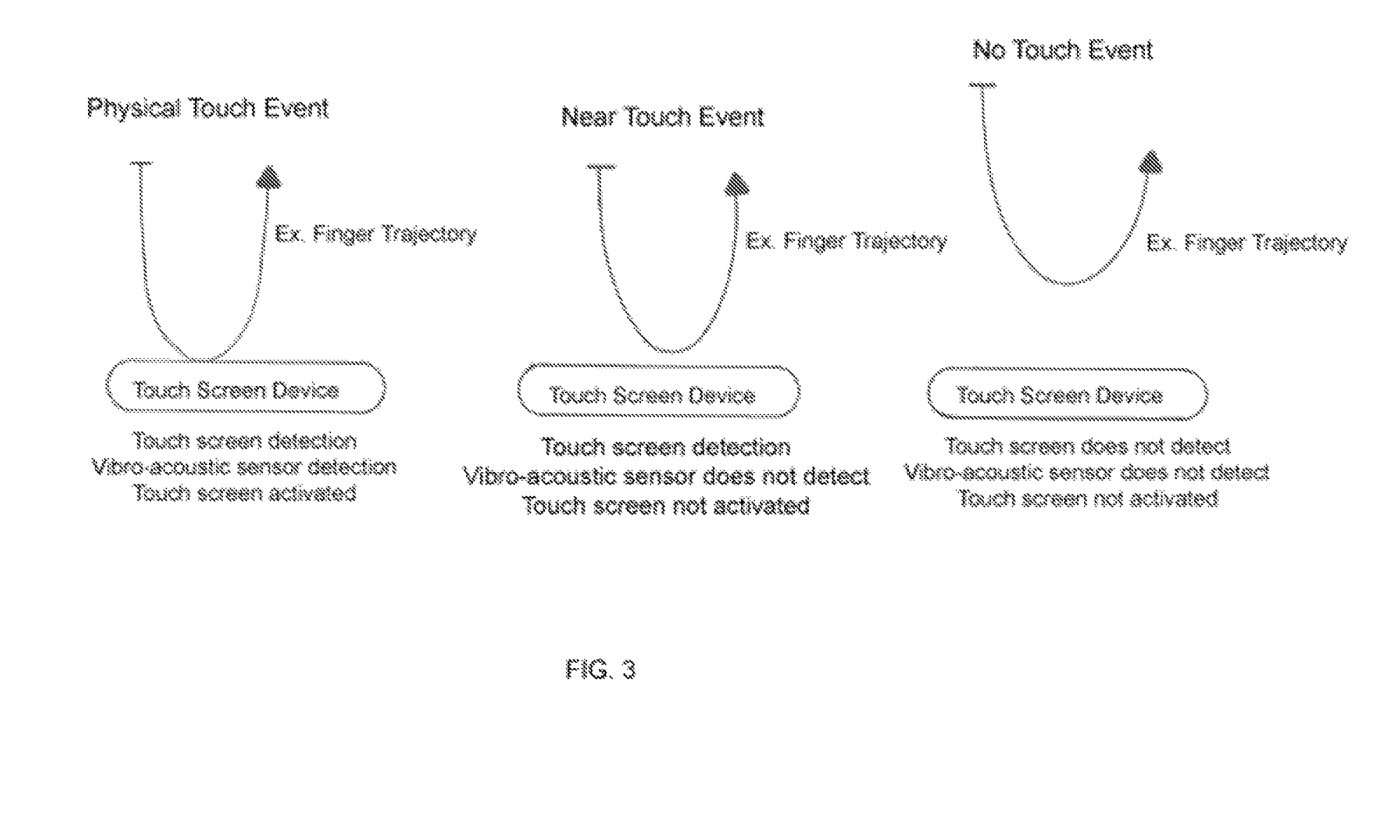
FIG. 3 is an example graphical representation illustrating three alternative touch-like events and their respective outcomes in regard to a touch-induced activation of the display, in accordance with some embodiments of the present invention.

FIG. 3 is an example graphical representation illustrating three alternative touch-like events and their respective outcomes in regard to a touch-induced activation of the display, in accordance with some embodiments of the present invention. The practical results of the disclosed embodiment in regard to a touch screen device such as a smart phone, are illustrated in FIG. 3. FIG. 3 shows, respectively, the physical touch event, the near touch event and the no touch event. By employing the present invention, only the physical touch event results in activation of the touch screen. With the ambiguous near touch event, which would otherwise activate the screen without use of the present invention, the touch screen is not activated, thereby preventing inadvertent energizing of the display.

Figure 4:
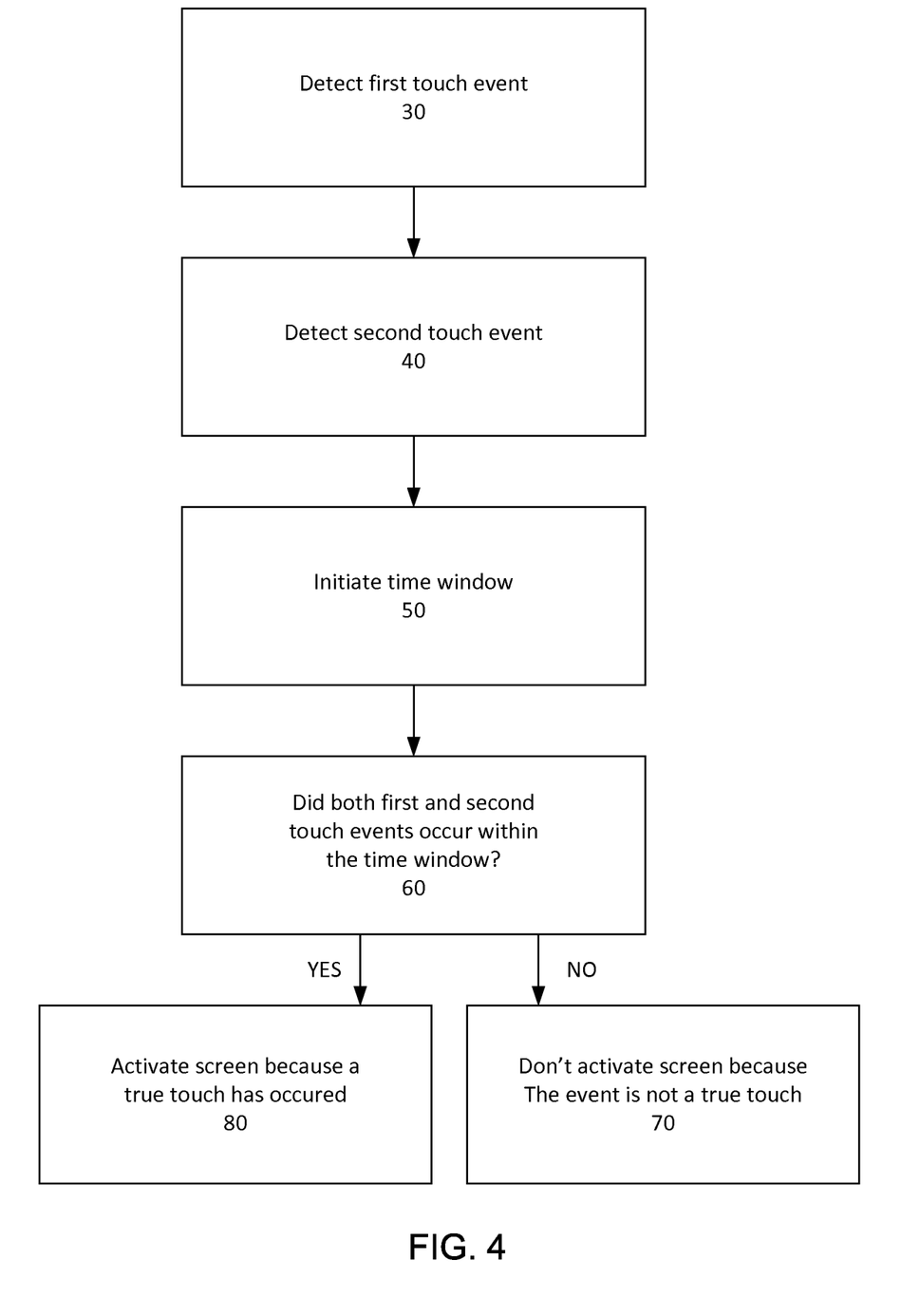
FIG. 4 is an example flow chart of an embodiment of the method of the invention, in accordance with some embodiments of the present invention.

FIG. 4 is an example flow chart of an embodiment of the method of the invention, in accordance with some embodiments of the present invention. Steps 30 and 40 represent sensor activation of first and second sensors based upon two different physical actions. Step 50 represents the initiating of the time window and step 60 determines whether or not both sensors were activated within the time window yielding a NOT TOUCH in step 70 and a YES TOUCH in step 80.

Thus it will be understood that what has been disclosed herein are an apparatus and method for reducing or entirely eliminating unintentional activation of a touch-sensitive display by use of two distinct sensors detecting distinctly different physical phenomena to obviate display activation in response to an ambiguous near touch event.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory ("ROM") and random access memory ("RAM").

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

We claim:

1. A method for reducing unintentional activation of a touch-sensitive display of a device, the method comprising:
providing a first sensor for detecting a first event indicating an object touching or hovering over the touch-sensitive display, wherein the first sensor comprises a touch screen sensor based on a capacitive, optical, or electric field technology;
providing a second sensor for detecting a second event indicating a vibro-acoustic event imparting vibrations into the device via the touch-sensitive display or via other device portions outside the touch-sensitive display, wherein the first event and the second event are distinctly different physical phenomena, wherein the second sensor comprises at least one of a condenser microphone or a microelectro-mechanical systems (MEMS) microphone;
initiating a time window associated with a window timer in response to detecting at least the first event associated with the first sensor or the second event associated with the second sensor, wherein the time window comprises a period of time less than 500 milliseconds;
based on both the first event and the second event being detected within the time window, determining that an object is touching the touch-sensitive display, an object is not hovering over the touch-sensitive display, and vibrations are imparted into the device via the touch-sensitive display;
based on the second event but not the first event being detected within the time window, determining that vibrations are imparted into the device but not via the touch-sensitive display and that an object is not touching the touch-sensitive display;
activating the touch-sensitive display from a low energy usage state in response to both the first event and the second event being detected within the time window and in response to determining that an object is touching the touch-sensitive display, an object is not hovering over the touch-sensitive display, and vibrations are imparted via the touch-sensitive display into the device; and
maintaining the touch-sensitive display in the low energy usage state in response to the second event but not the first event being detected within the time window and in response to determining that vibrations are imparted into the device, but not via the touch-sensitive display, and that an object is not touching the touch-sensitive display.

2. The method recited in claim 1, further comprising: in response to the first sensor detecting the first event and the second sensor not detecting the second event within the time window, determining that the first event indicates an object is not touching the touch-sensitive display.

3. The method recited in claim 1, wherein the time window comprises a maximum period of 300 milliseconds.

4. An apparatus comprising:
a touch-sensitive display;
a first sensor for detecting a first event indicating an object touching or hovering over the touch-sensitive display, wherein the first sensor comprises a touch screen sensor based on a capacitive, optical, or electric field technology;

a second sensor for detecting a second event indicating a vibro-acoustic event imparting vibrations into the apparatus via the touch-sensitive display or via other apparatus portions outside the touch-sensitive display, wherein the first event and the second event are distinctly different physical phenomena, wherein the second sensor comprises at least one of a condenser microphone or a microelectro-mechanical systems (MEMS) microphone;

at least one logic device for:
  initiating a time window associated with a window timer in response to detecting at least the first event associated with the first sensor or the second event associated with the second sensor, wherein the time window comprises a period of time less than 500 milliseconds,
based on both the first event and the second event being detected within the time window, determining that an object is touching the touch-sensitive display, an object is not hovering over the touch-sensitive display, and vibrations are imparted into the device via the touch-sensitive display;
based on the second event but not the first event being detected within the time window, determining that vibrations are imparted into the device but not via the touch-sensitive display and that an object is not touching the touch-sensitive display;
activating the touch-sensitive display from a low energy usage state in response to both the first event and the second event being detected within the time window and in response to determining that an object is touching the touch-sensitive display, an object is not hovering over the touch-sensitive display, and vibrations are imparted via the touch-sensitive display into the device; and
maintaining the touch-sensitive display in the low energy usage state in response to the second event but not the first event being detected within the time window and in response to determining that vibrations are imparted into the device, but not via the touch-sensitive display, and that an object is not touching the touch-sensitive display.

5. The apparatus recited in claim 4, wherein the at least one logic is further configured for determining that the first event indicates an object is not touching the touch-sensitive display in response to the first sensor detecting the first event and the second sensor not detecting the second event within the time window.

6. The apparatus recited in claim 4, wherein the time window comprises a maximum period of 300 milliseconds.

7. The apparatus recited in claim 4 wherein the at least one logic device comprises an OR gate connected to initiate a time window generator associated with the time window when either of the first sensor and the second sensor detects a respective first or second event, and an AND gate connected to activate the touch-sensitive display when both the first sensor and the second sensor detect respective first and second events during the time window.

8. A non-transitory computer readable medium containing instructions for reducing inadvertent activation of a touch-sensitive display of a device, wherein execution of the program instructions by a processor causes the processor to carry out the steps of:
  providing a first sensor for detecting a first event indicating an object touching or hovering over the touch-sensitive display, wherein the first sensor comprises a touch screen sensor based on a capacitive, optical, or electric field technology;
  providing a second sensor for detecting a second event indicating a vibro-acoustic event imparting vibrations into the device via the touch-sensitive display or via other device portions outside the touch-sensitive display, wherein the first event and the second event are distinctly different physical phenomena, wherein the second sensor comprises at least one of a condenser microphone or a microelectro-mechanical systems (MEMS) microphone;
  initiating a time window associated with a window timer in response to detecting at least the first event associated with the first sensor or the second event associated with the second sensor, wherein the time window comprises a period of time less than 500 milliseconds;
  based on both the first event and the second event being detected within the time window, determining that an object is touching the touch-sensitive display, an object is not hovering over the touch-sensitive display, and vibrations are imparted into the device via the touch-sensitive display;
  based on the second event but not the first event being detected within the time window, determining that vibrations are imparted into the device but not via the touch-sensitive display and that an object is not touching the touch-sensitive display;
  activating the touch-sensitive display from a low energy usage state in response to both the first event and the second event being detected within the time window and in response to determining that an object is touching the touch-sensitive display, an object is not hovering over the touch-sensitive display, and vibrations are imparted via the touch-sensitive display into the device; and
  maintaining the touch-sensitive display in the low energy usage state in response to the second event but not the first event being detected within the time window and in response to determining that vibrations are imparted into the device, but not via the touch-sensitive display, and that an object is not touching the touch-sensitive display.

9. The computer readable medium of claim 8, wherein the steps further comprise: in response to the first sensor detecting the first event and the second sensor not detecting the second event within the time window, determining that the first event indicates an object is not touching the touch-sensitive display.

* * * * *